United States Patent [19]

Chabala et al.

[11] Patent Number: 4,752,859
[45] Date of Patent: Jun. 21, 1988

[54] ARRANGEMENT FOR PROVIDING VARIOUS CIRCUIT PROTECTION DEVICE CONFIGURATIONS

[75] Inventors: Leonard V. Chabala, Maywood; Robert H. Harner, Park Ridge; Thomas J. Tobin, Northbrook, all of Ill.

[73] Assignee: S&C Electric Company, Chicago, Ill.

[21] Appl. No.: 721,614

[22] Filed: Apr. 10, 1985

[51] Int. Cl.⁴ .............................................. H02B 5/00
[52] U.S. Cl. ................................. 361/333; 200/48 R; 361/335
[58] Field of Search ................. 200/48 R, 48 P, 48 A, 200/48 KB, 48 SB, 48 V, 145, 148 R, 148 F; 361/333, 335, 341, 355, 361

[56] References Cited

U.S. PATENT DOCUMENTS

| | | | |
|---|---|---|---|
| Re. 27,625 | 4/1973 | Weston | 200/48 SB |
| Re. 30,784 | 10/1981 | Bridges | 200/48 KB |
| 2,163,558 | 6/1939 | MacNeill | 200/145 |
| 3,071,668 | 1/1963 | Upton et al. | 200/48 R |
| 3,163,736 | 12/1964 | Mikos et al. | 200/145 |
| 3,291,949 | 12/1966 | Cromer | 200/145 |
| 3,441,692 | 4/1969 | Cromer et al. | 200/48 R |
| 4,215,256 | 7/1980 | Sakaguchi | 200/148 F |
| 4,541,033 | 10/1985 | Saita | 361/333 |

Primary Examiner—A. D. Pellinen
Assistant Examiner—Gregory D. Thompson
Attorney, Agent, or Firm—James V. Lapacek

[57] ABSTRACT

An arrangement for efficiently assembling and providing a plurality of circuit protection device configurations by use of major components that are common to the configurations and that are adapted for interconnection and functioning with each other; some of the major components providing different or multiple functions in the various configurations. The various configurations satisfy the application requirements and customer needs with regard to voltage rating, efficient space usage, station layouts, and the provision of disconnect mechanisms. The configurations include various orientations of interrupting units and the provision of various types of disconnect mechanisms. The major components include an operator, an interrupting unit, an insulating support column, and a base drive. The operator provides a first drive output and a second drive output. The insulating support column is capable of being rotated to provide a rotary drive output for disconnect mechanisms. The insulating support column also internally carries an operating member. The operating member is driven to operate the interrupting unit. The base drive is connected to receive the first drive output of the operator and in turn to provide a driving output to the operating member. The second drive output is connected through appropriate linkage to rotate the insulating support column.

10 Claims, 4 Drawing Sheets

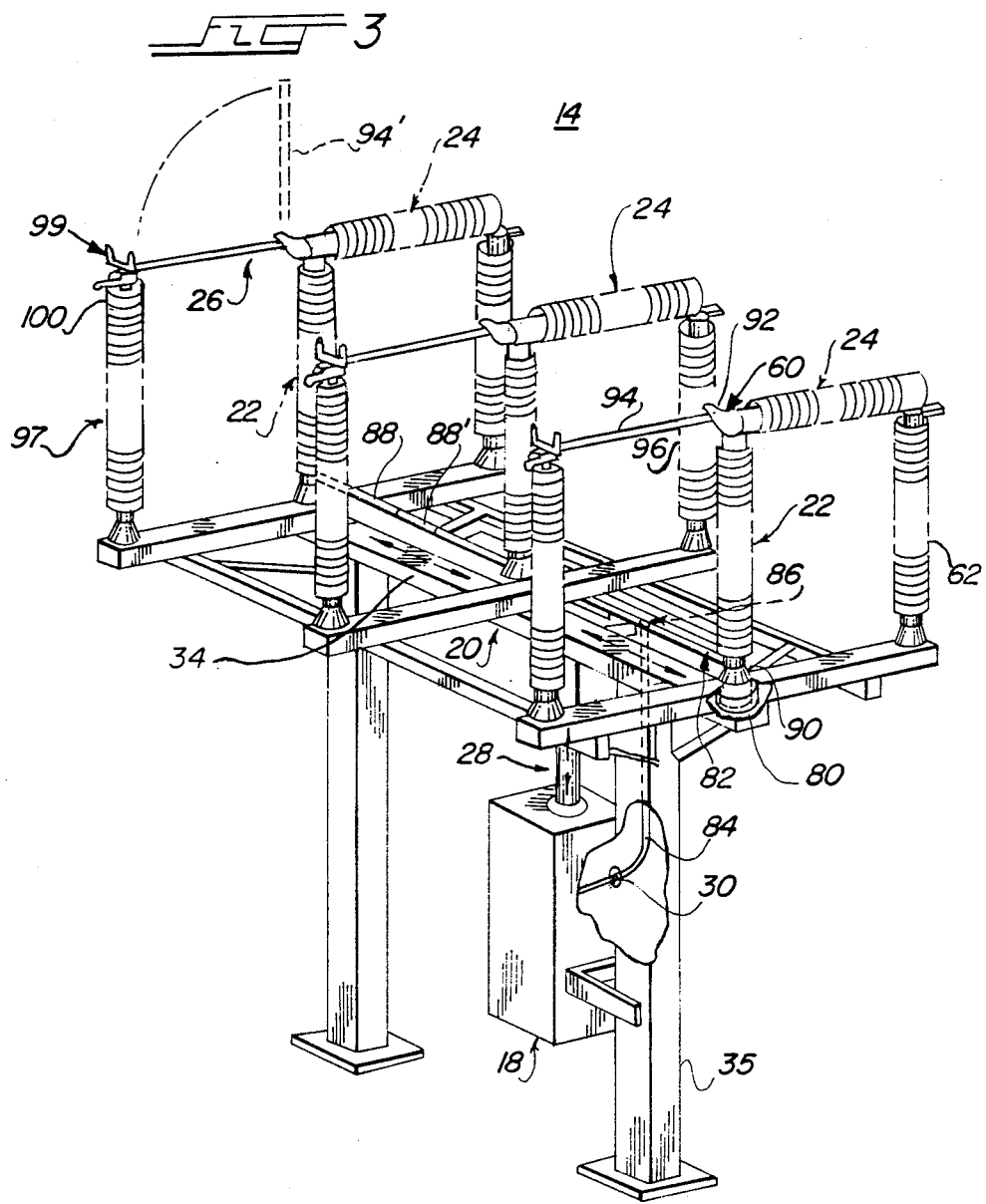

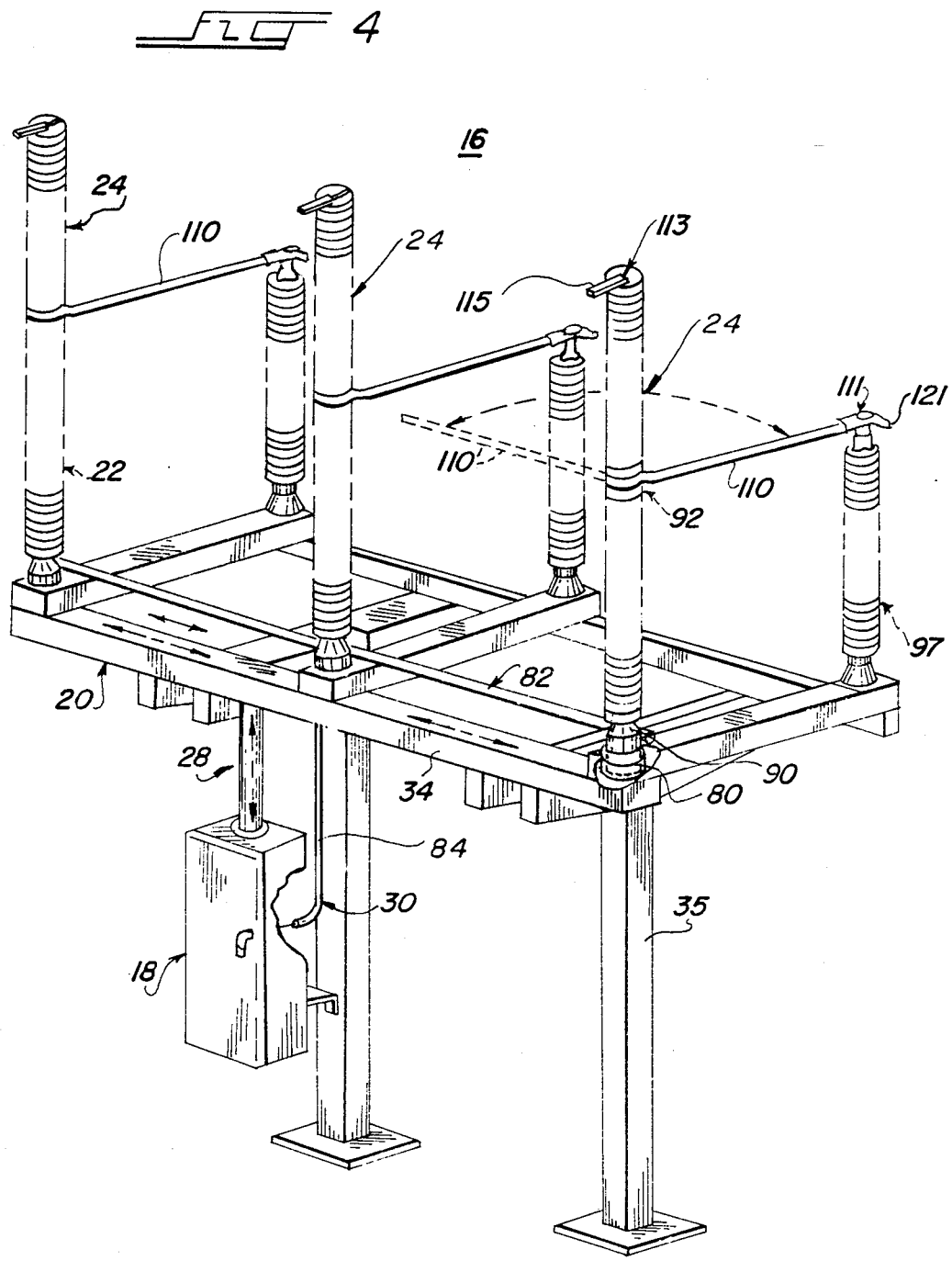

ARRANGEMENT FOR PROVIDING VARIOUS CIRCUIT PROTECTION DEVICE CONFIGURATIONS

CROSS-REFERENCE TO RELATED APPLICATIONS

This application is directed to circuit protection device configurations that utilize the insulating support columns, operator mechanism, base drive linkage, and various linkage arrangements disclosed and claimed in commonly-assigned, copending application Ser. Nos. 721,617 (now U.S. Pat. No. 4,636,602) and 721,616 (now U.S. Pat. No. 4,596,906) respectively filed in the names of W. J. Hall et all and L. V. Chabala et al on Apr. 10, 1985, these applications being incorporated by reference in this application for all purposes.

BACKGROUND OF THE INVENTION

1. Field of the Invention

The present invention relates generally to the field of circuit protection devices and more particularly to a method and arrangement for providing a plurality of different configurations utilizing several major components that are adapted for interconnection and functioning with each other to achieve this end.

2. Description of the Related Art

Various configurations of circuit protection devices and the like, with or without the provision of disconnect mechanisms, are known in the prior art to provide desired orientations of circuits interrupters and the like.

While these arrangements are generally suitable for their intended purpose, these arrangements are limited in the manner in which they can efficiently provide a variety of configurations with or without the provision of disconnect mechanisms. For example, the prior arrangements do not provide a desirable variety of configurations. Further, the major components are not capable of being efficiently interconnected and arranged to provide a desirable variety of configurations without modifications to the major components and the addition of numerous parts.

SUMMARY OF THE INVENTION

Accordingly, it is a principal object of the present invention to utilize a minimum number of different components to efficiently provide a plurality of different circuit protection device configurations with or without disconnect mechanisms.

It is another object of the present invention to provide a plurality of different circuit protection device configurations by the use of major components that are common to the configurations and that are adapted for interconnection and functioning with each other; some of the major components providing different or multiple functions in the various configurations.

It is a further object of the present invention to provide efficient shipment of components of circuit protection device configuratons and convenient field assembly of the components into the desired configurations.

Briefly, these and other objects of the present invention are efficiently achieved by providing a plurality of different circuit protection device configurations to satisfy the application requirements and customer needs with regard to voltage rating, efficient space usage, station layouts, and the provision of disconnect mechanisms. The different configurations include different orientations of interrupting units and the provision of various types of disconnect mechanisms. The circuit protection device configurations in the preferred embodiment are specifically adapted for three-phase power connection and application. The configurations are achieved by the use of major components that are common to the configurations. While the term component is used throughout this application, it should be realized that this term encompasses assemblies, parts, units and the like. The term component is conveniently used to refer to the individual elements or parts of each configuration and their cooperation to function as modules and "building-blocks" to achieve the various configurations.

The first major, common component is an operator including a first linear translational base drive output and a second drive output. The second drive output in a specific embodiment is a rotary drive output. The first drive output is connected to the input of a base drive which is the second major, common component. The base drive includes a base support member and base-drive linkage carried by the base support member. The base-drive linkage, in response to the first drive output, provides one or more spaced-apart, translational base-drive outputs having parallel axes of translation. The third major, common element is an insulating support column which functions as an operating column. One or more insulating support columns are mounted with respect to the base support member with each of the columns being aligned with a respective one of the base-drive outputs. The insulating support columns include an elongated longitudinal bore. An elongated operating member extends through the bore and outside of and below the insulating support column. Each operating member is arranged generally parallel to and aligned with a respective one of the base-drive outputs. The operating members are connected to the base-drive outputs with translation of each drive output providing translational movement of the operating members with respect to the insulating support columns. The fourth major, common component is an interrupting unit which includes an actuating member. Movement of the actuating member between operative positions operates the interrupting unit.

In a first configuration, each interrupting unit is affixed to the top of a respective insulating support column with the actuating member of each interrupting unit being generally aligned with and connected to a respective operating member of one of the insulating support columns. Accordingly, operation of the first drive output operates all interrupting units from a single operator.

To achieve a second configuration, the interrupting units are arranged generally perpendicular to the insulating support columns and their respective operating members. One end of each interrupting unit is supported by an insulating support column and the other end is supported by an additional insulator. A translational linkage is provided between the operating member of each insulating support column and the actuating member of the respective interrupting unit. The translation linkage converts reciprocating motion of the operating member to reciprocating motion along the axis of the actuating member. The translation linkage is supported by a transition housing that is affixed to the interrupting unit and the insulating support column.

A third configuration with a series-connected disconnect is provided that differs from the second configuration by the addition of a tubular shaft affixed atop each of the insulating support columns, the rotatable mounting of the insulating support columns, and the addition of a disconnect blade for each phase that is driven from the tubular shaft atop each insulating support column. The operating member extends into the tubular shaft. The tubular shaft includes a cut-away portion for passage of the translational linkage between the operating member inside the tubular shaft and the actuating member of the interrupting unit. The transition housing is rotatably supported on the tubular shaft with the other end of the transition housing being connected to the interrupting unit. The disconnect blade in a closed position is aligned generally perpendicularly to the insulating support column and is supported by the transition housing. An insulator with a connector and stationary contact is provided for alignment with the outer end of each disconnect blade when in the closed position. The disconnect blade and the interrupting unit are electrically connected in series. The second output drive of the operator is connected via a second drive linkage to a base member at the bottom of each insulating support column to effect rotation thereof. The operating member passes through the base member for connection to the base-drive output. A linkage is provided between the tubular shaft and the disconnect blade to convert rotation of the column to movement of the disconnect blade in a vertical plane. Accordingly, operation of the second drive output of the operator rotates each insulating support column and opens or closes the disconnect blades. Independently thereof, operation of the first drive output translates each operating member to operate the interrupting units. While the arrangement of the rotary and linear drive functions provided by the insulating support columns are independently operable in any position of their operation, the present invention is arranged for sequenced operation thereof.

A fourth configuration with series-connected disconnect is provided that differs from the first configuration by the addition of a disconnect blade for each pole directly connected to the top of a respective support column and electrically connected in series with a respective interrupting unit. Additionally, the insulating support columns are rotatably mounted and the second drive output of the operator is connected to the bottom of the support column via the second drive linkage. As is the first configuration, reciprocation of the operating member of each support column via the first drive output operates the respective interrupting unit. Additionally, rotation of each support column causes the disconnect blades to rotate in a horizontal plane between open and closed positions. An additional insulator is provided for alignment with each respective disconnect blade in the closed position. Appropriate power connections are provided by a connector and stationary contact on each insulator. If it is desired to hold the operating member fixed with respect to the base-drive output connection, a swivel connection is provided between the operating member of each insulating support column and the actuating member of each interrupting unit; the support column rotating about the operating member with relative rotation therebetween. On the other hand, if it is desired to have each operating member rotate with the respective support column, a swivel connection is provided between each operating member and the base-drive outputs. In that arrangement, the entire assembly of the interrupting unit, the disconnect blade, the support column and the operating member rotate together with no relative motion therebetween.

In addition to eficiently providing the various circuit protection device configurations, the present invention also efficiently provides modification to each configuration for various ranges of voltage ratings; the different ranges of voltage ratings and the application specifications dictating different interpole spacing and clearance of live parts from ground potential. Specifically, the insulating support columns are stacked end-to-end with either provision of an appropriate-length operating member or interconnection of the respective operating members to provide columns of increased height; the resultant stacked, support column still providing the rotating and linear drive outputs. Further, the base drive linkage and the second drive linkage are either assembled with appropriate length links or modified by the addition of extension sections to provide for different interpole spacing.

BRIEF DESCRIPTION OF THE DRAWING

The invention both as to its organization and method of operation, together with further objects and advantages thereof, will best be understood by reference to the specification taken in conjunction with the accompanying drawing in which FIGS. 1 through 4 are perspective views, with parts cut away for clarity, illustrating four respective configurations provided by the present invention.

DETAILED DESCRIPTION

Figure 1:
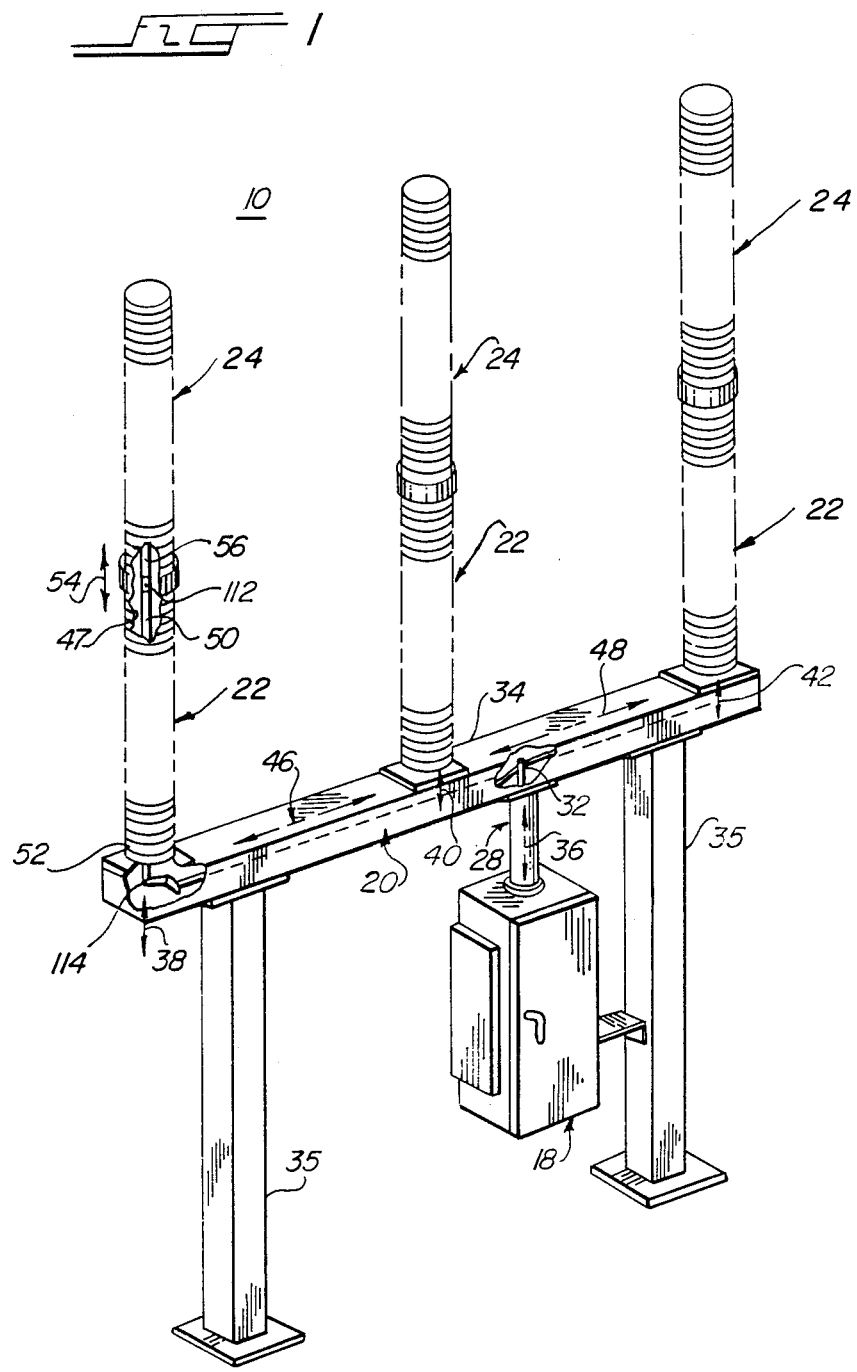

Referring now to FIGS. 1 through 4, the arrangement of the present invention provides the four respective configurations referred to generally at 10, 12, 14, and 16 by means of the interconnection of the illustrated major components that are common to each configuration. The major, common components are adapted for interconnection and functioning with each other and the various other components. The major, common components include an operator 18, a base drive arrangement 20, an insulating support column 22, and an interrupting unit 24. A disconnect mechanism 26 is also provided in the configuration of FIG. 3 and a disconnect blade 110 is provided in the configuration of FIG. 4.

The operator 18 includes a power source to provide a first, linear drive output 28 and a second drive output 30 which is shown in FIGS. 3 and 4. In a specific embodiment, the second drive output 30 is a rotary drive output. The first, linear drive output 28 is connected to an input 32 of the base drive arrangement 20. the base drive arrangment 20 includes a base support member 34 which carries base drive linkage of the arrangement 20. The base support member 34 is typically suspended upon two pedestals 35 which are suitably anchored to foundations. In response to the first, linear drive output 28 which translates in the directions indicated at 36, the base drive arrangement 20 provides three, spaced-apart, translating drive outputs 38, 40 and 42, one for each pole of a three-phase power connection for which the specific illustrated embodiment of the present invention is intended. The three drive-outputs 38, 40 and 42 are arranged to provide three, spaced-apart, base-drive outputs having generally parallel axes of translation. The base drive linkage of the arrangement 20 includes various pivotal members and coupling links which are diagramatically represented by the directional arrows 46 and 48. Reference may be made to the aforementioned application Ser. No. 721,617, now U.S. Pat. No. 4,636,602 for a more complete discussion of the base drive arrangement 20 and the operator 18. Specifically, the base drive arrangement 20 is illustrated in FIG. 16 of U.S. Pat. No. 4,636,602 and is described at columns 14 and 15 thereof.

The insulating support columns 22 are mounted with respect to the base support member 34 with each of the columns 22 being aligned with a respective one of the base-drive outputs 38, 40 and 42. Each of the insulating support columns 22 includes an elongated, longitudinal bore 47 and an elongated operating member 50 that extends through the bore 47, and through and below a lower base member 52 of the insulator support column 22. Each of the operating members 50 is arranged generally parallel to, aligned with, and connected to a respective one of the base drive outputs 38, 40 and 42. Accordingly, translation of the drive outputs 38, 40 and 42 provides corresponding translation of the operating members 50 with respect to the support columns 22 as represented by directional arrows 54. Reference may be made to the aforementioned application Ser. No. 721,616, now U.S. Pat. No. 4,596,906, for a more detailed discussion of the insulating support column 22 which may also be referred to as an insulative operating column. Specifically, FIGS. 1 and 4 of U.S. Pat. No. 4,596,906 illustrate the operating member 50 within the bore 47 of the insulating support column 22. In that implementation, the operating member is supported for translational and rotational movement relative to the insulating support column via bearings referred to at 44 in FIGS. 1 and 4 of U.S. Pat. No. 4,596,906.

The interrupting unit 24 includes a longitudinally disposed actuating member 56; the actuating member 56 being moved between operative positions along the longitudinal axis of the interrupting unit 24 to define open and closed states of the interrupting unit 24. Reference may be made to U.S. Pat. No. 4,324,959 for a more detailed discussion of an interrupting unit of this general type.

In the first configuration 10 of FIG. 1, the interrupting units 24 are affixed to the top of the insulating support columns 22 with the actuating members 56 being generally aligned with and connected at 112 to the operating members 50 of the insulating support columns 22; corresponding to a vertical arrangement of both the interrupting unit 24 and the insulating support column 22 as shown in FIG. 1. Accordingly, operation of the first drive output 28 of the operator 18 operates the interrupting units 24. The simplicity and efficient space usage of this first configuration 10 should be noted as this configuration does not require any additional insulators to support the interrupting units 24. Accordingly, as illustrated by the first configuration 10 of FIG. 1, the basic configurations of the arrangement of the present invention are not complicated by the provision of more complex configurations. It should also be noted that a single operator 18 is used to operate all three interrupting units 24 through the base drive arrangement 20 which is a rapid-acting device. The base support member 34 of the base drive arrangement 20 also supports the insulating support columns 22.

Figure 2:
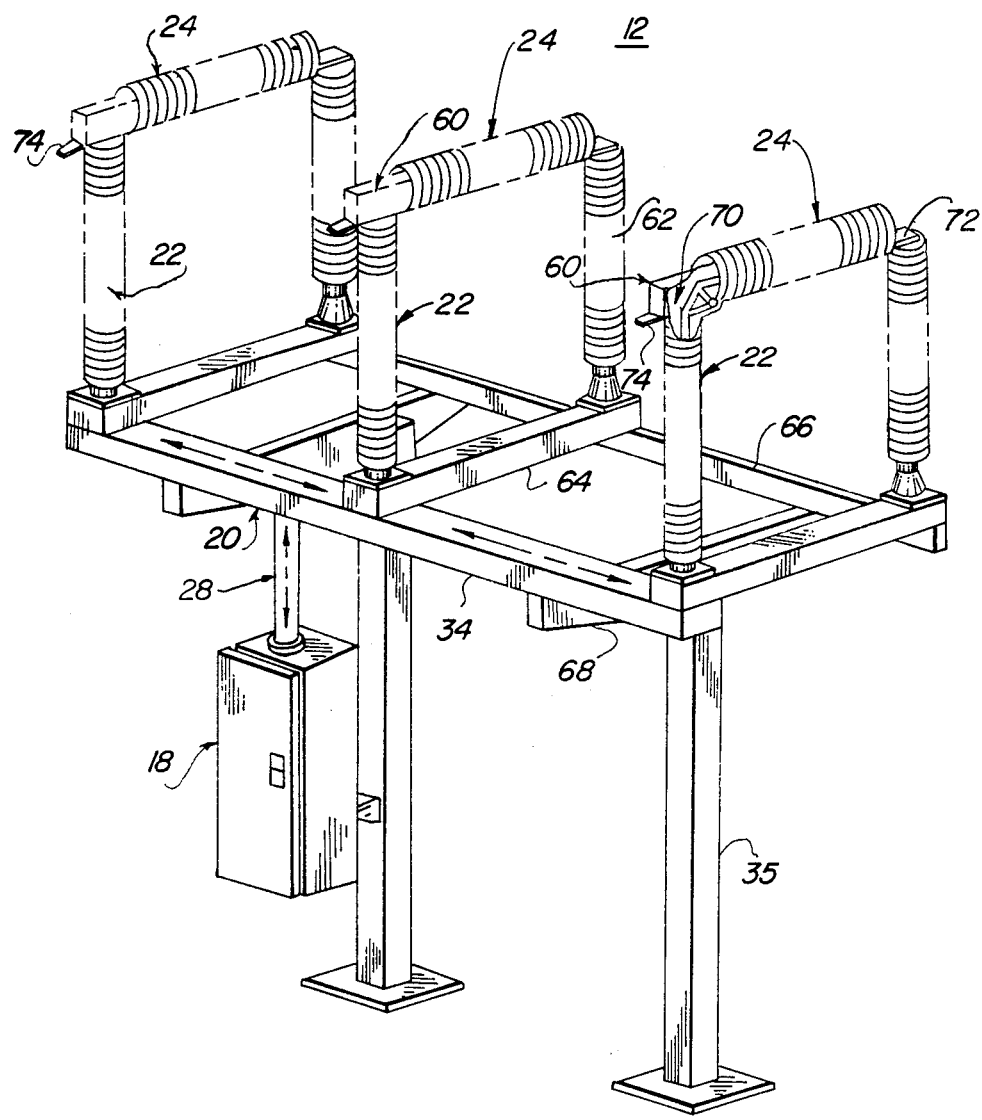

Referring now specifically to FIG. 2, the second configuration 12 includes the interrupting units 24 being arranged generally perpendicular to the insulating support columns 22; corresponding to a horizontal orientation of the interrupting units 24 and a vertical orientation of the support columns 22 as shown in FIG. 1. One end of each of the interrupting units 24 is supported by an insulating support column 22 through a transition housing 60. The other end of each interrupting unit 24 is supported by the provision of a respective insulator 62. The insulators 62 are supported by cross beams 64, a second base support member 66, and struts 68 connected between the base support members 34 and 66. A translation linkage 70 is pivotally supported on the transition housing 60 and interconnects the operating member 50 and the actuating member 56. The translation linkage 70 converts the vertical reciprocating motion of the operating member 50 to horizontal reciprocating motion of the actuating member 56. An electrical connector terminal 74 is provided on each of the transition housings 60 and a second connector terminal 72 is provided at the other end of each of the interrupting units 24.

Considering now the third configuration 14 with a series-connected disconnect and referring now to FIG. 3, the third configuration 14 differs from the second circuit configuration by the addition of a disconnect mechanism 26 for each pole and by rotatably mounting each insulating support column 22. The insulating support columns 22 are rotatably mounted with respect to the base member 34 by means of a bearing support housing 80.

The second drive output 30 is connected to rotate the insulating support columns 22 through a second drive linkage 82. The second drive linkage 82 includes a first vertical, coupling-link member 84 that is connected at one end to the second drive output 30. The second end of the coupling-link member 84 is connected at 86 to a horizontal link member 88. The horizontal link member 88 is arranged generally parallel to the base member 34 and is conencted to a lower base member 90 through which the operating member 50 passes. Rotation of the second drive output 30 causes translation of the horizontal link member 88 and rotation of the insulating support columns 22.

The transition housing 60 is rotatably supported on a tubular shaft 92 affixed at the top of the insulating support column 22. The operating member 50 extends into the tubular shaft 92. The tubular shaft 92 is cut away (i.e. includes an aperture of predetermined dimensions) to allow passage of the translation linkage 70 between the operating member 50 and the actuating member 56. A disconnect blade 94 is attached to the tubular shaft 94 is also pivotally supported with respect to the tubular shaft 92. The disconnect blade 94 in a closed position is arranged generally parallel to the interrupting unit 24 and generally perpendicular to the insulating support column 22; i.e. the blade 94 in the closed position is arranged horizontally in FIG. 3.

When the insulating support column 22 is rotated via the second output 30 of the operator 18, the rotating tubular shaft 92 through the rotary to twisting translation mechanism 96 imparts a lifting action to open the disconnect blade 94 to the approximately vertical open position 94'. Independently of the second drive output 30 and the disconnect operation, the first drive output 28 translates the operating member 50 to operate the interrupting unit 24. An insulator 97 with suitable connector and contact assembly 99 is provided for alignment with the outer end of the disconnect blade 94 in the closed position for making connection to the terminal at 100. In this configuration, the insulating support column 22 rotates about the operating member 50. Reference may be made to the aforementioned application Ser. No. 721,616, now U.S. Pat. No. 4,596,906, for a more detailed discussion of the tubular shaft 92 and the translation linkage 70. Specifically, FIGS. 1-3 of U.S. Pat No. 4,596,906 illustrate the relationship between the tubular shaft 92 (referred to at 52 in U.S. Pat. No. 4,596,906), the top portion of the operating member 50 (referred to at 42,60 in U.S. Pat. No. 4,596,906), and the translation linkage 70 (referred to at 62,64 in U.S. Pat. No. 4,596,906). Further, reference may be made to U.S. Pat. No. 3,508,178 for a more detailed discussion of the translation mechanism 96. Specifically, the rotary-to-twisting mechanism 96 is illustrated in FIG. 1 of U.S. Pat. No. 3,508,178 and is referred to at switch crank 19, link 20, clevis 21, and arm 22. The disconnect blade 94 is referred to at 18 in that patent and the tubular shaft 92 is referred to at 15.

While the arrangement of the rotary and linear drive functions provided by the insulating support column 22 are totally independently operable in any position of the drive outputs for the interrupting unit 24 and the disconnect blade 94, the present invention is arranged for sequenced operation thereof. The time between various portions of the sequence is determined by circuit conditions and/or operating personnel. The sequencing does not form part of the present invention. However, for a general understanding of a typical application of the present invention, the sequenced operation will be briefly described. Assume that the normal condition is the completion of the electricl circuit through the closed interrupting unit 24 and the disconnect blade 94. If a fault condition occurs, the operator 18 rapidly opens the interrupting units 24 via the fast-acting base drive arrangement 20 and proceeds to open the disconnect blade 94 via the second drive output 30. To reestablish the circuit path, the disconnect blade 94 is closed while the interrupting units 24 remain open. Thereafter, the interrupting units 24 are closed by operation of the first drive output 28. If a fault condition is present, the interrupting units 24 are capable of being immediately reopened.

The fourth configuration 16 of FIG. 4 with series-connected disconnect differs from the first configuration 10 by the addition of a disconnect blade 110 arranged generally perpendicularly to the insulating support column 22 so as to be horizontal in FIG. 4. The disconnect blade 110 is attached directly to the tubular shaft 92 of the insulating support column 22 for electrical connection to the output of the interrupting unit 24; thereby placing the interrupting unit 24 and the disconnect in series. Additionally, as with the third configuration 14, the insulating support columns 22 are rotatably mounted with respect to the base member 34 by means of the bearing support housing 80. The second drive linkage 82 is also provided as in the third configuration 14 for connection of the second output drive 30 to the base member 90 of each of the insulating support columns 22. As before, translation of the operating member 50 of each insulating support column 22 by the first drive output 28 operates the interrupting units 24 as in the first configuration 10. Additionally, rotation of the support columns 22 operates the disconnect blades 110 so as to rotate in a horizontal plane to the position 110'. An insulator 97 is provided for alignment with each of the disconnect blades 110 when in the closed position. A suitable connector and contact assembly 111 is provided atop each insulator post 97 for connection at 121 to a three-phase source. The top of each interrupting unit 24 includes a swivel connection 113 to provide a load connection at 115.

If it is desired to hold the operating member 50 fixed with respect to the base-drive output connections at 38, 40, and 42, a swivel connection is provided between the operating member 50 and the actuating member 56 of the interrupting unit 24; e.g. at the connection point 112 in FIG. 1. With the swivel connection at 112, the support column 22 and the interrupting unit 24 rotate about the operating member 50 with relative motion therebetween. On the other hand, if it is desired to have the operating member 50 rotate with the support column 22, a swivel connection is provided between the operating member 50 and the base-drive output at 114 in FIG. 1; such an arrangement being illustrated in the aforementioned application Ser. No. 721,616 (now U.S. Pat. No. 4,596,906) in FIG. 6 thereof. In that arrangement, the entire assembly of the interrupting unit 24, the disconnect blade 110, the support column 22, and the operating member 50 rotate with no relative rotation therebetween.

Accordingly, the arrangement of the present invention efficiently provides the four illustrative configurations as well as others with a minimum of major, commonly-used components and other parts. Additionally, the insulating support columns 22 can be stacked end-to-end, that is affixed one atop the other, to provide modification of the different configurations for different interpole spacings in accordance with the desired spacing from live parts to ground potential. In this manner, the respective operating members 50 of the stacked support columns are connected together with the upper tubular shaft of the lower column being fastened to the lower base member of the upper column. Further, for achieving the appropriate phase-to-phase or interpole spacing in the various configurations, the base drive linkage of arrangement 20 and the second drive linkage 82 are lengthened by the provision of extender sections of various length between phases; e.g. an extender section 88' in FIG. 3 to increase the interpole spacing.

While there has been illustrated and described various embodiments of the present invention, it will be apparent that various changes and modifications will occur to those skilled in the art. It is intended in the appended claims to cover all such changes and modifications as fall within the true spirit and scope of the present invention.

What is claimed and desired to be secured by Letters Patent of the United States is:

1. A circuit protection device arrangement including n interrupting units, n insulating support columns, a base drive, and an operator, where n is greater than 1, each of said n insulating support columns including an internally carried, elongated operating member which is capable of relative rotation and translation with respect to said insulating support column, translation of said elongated operating member being utilized to operate said respective interrupting unit, said base drive including a base-drive linkage having n translational outputs and a base support member for housing said base-drive linkage and supporting said n insulating support columns, each of said n translational outputs being connected to drive a respective one of said n elongated operating members, said operator including a first drive output, said first drive output being connected to said base-drive linkage.

2. The arrangement of claim 1 further comprising means for rotatably mounting each of said insulating support columns with respect to said base support member, and wherein said operator includes a second drive output, said second drive output being connected to rotate said insulating support columns.

3. The arrangement of claim 1 wherein each of said n interrupting units includes an actuating member, each of said actuating members being connected to a respective one of said operating members.

4. The arrangement of claim 1 wherein each of said n insulating support columns and said n interrupting units are elongated and define a longitudinal axis, said longitudinal axis of each of said n insulating support columns being parallel to or coincident with a respective one of said operating members, said longitudinal axis of each of said n interrupting units being generally aligned with a respective one of said n insulating support columns.

5. The arrangement of claim 1 further including n elongated disconnect blades and means for rotatably mounting said insulating support columns with respect to said base support member, one of said n elongated disconnect blades being carried by a respective one of said insulating support columns, rotation of said insulating suppport columns driving said disconnect blades.

6. The arrangement of claim 1 wherein each of said n interrupting units includes an actuating member, each of said n interrupting units being arranged generally perpendicular to said n insulating support columns, the arrangement further including n translation linkage means, one of said n translation linkage means being connected between each of said actuating members and said respective operating members for translating motion along said operating members to motion along said actuating members.

7. The arrangement of claim 6 further including means for rotatably mounting each of said n insulating support columns with respect to said base support member, and a disconnect mechanism for each of said insulating support columns, each of said disconnect mechanisms being operable for rotation in a plane parallel to the plane defined by each of said respective insulating support columns and interrupting units, rotation of each of said insulating support columns driving a respective one of said disconnect mechanisms.

8. A circuit protection device arrangement including a plurality of operable components that are adapted for selective assembly to provide one of a plurality of different operable configurations for multi-phase power connection, the operable components comprising:

an operator providing a first linear drive output and a second drive output;

base drive means responsive to said first linear drive output for providing n translational base-drive outputs, where n is greater than 1, said base drive means including an elongated base member and a base-drive linkage housed by said base member;

n insulating support columns being mounted with respect to said base member at positions such that one of said insulating support columns is aligned at a respective one of said n base-drive outputs, each of said insulating support columns having an elongated central bore extending therethrough and an elongated operating member extending through said bore and being arranged for translation with respect to said insulating support column, said insulating support column being capable of being rotated with respect to said operating member to provide a rotary output and including means adapted for rotatably mounting said insulating support columns with respect to said base drive means; and n interrupting units each having an actuating member movable along a translational path to effect opening and closing of said interrupting unit, said interrupting units being positioned such that each of said actuating members is adjacent one of said respective operating members;

said operable components being adapted for assembly to achieve a first configuration wherein each of said interrupting units are affixed to, supported by and aligned with a respective one of said insulating support columns, said respective operating members being aligned with and directly connected to said respective actuating members, translation of said operating members operating said interrupting units;

said operable components being adapted for assembly to achieve a second configuration and said circuit protection device arrangement being further characterized by n translation linkage means being added to said first configuration, one of said translation linkage means being connected between each of said actuating members of said interrupting units and said respective operating members of said insulating support columns, said interrupting units being disposed so that said interrupting units are generally perpendicular to said insulating support columns, said interrupting units being supported at one end by said insulating support columns, said translation linkage means converting translation along said operating members into translation along said actuating members of said interrupting units;

said operable components being adapted for assembly to achieve a third configuration and said circuit protection device arrangement being further characterized by adding to said second configuration n disconnect mechanisms, and a drive linkage that is connected between said second operator drive output and said rotatably mounting means of said insulating support columns, each of said disconnect mechanisms including a drive translation arrangement for each of said n insulating support columns that provides an output and that converts rotary motion of said insulating supplor column to lifting motion at said output for rotation in a vertical plane.

9. A circuit protection device comprising:

an operator including a first linear drive output and a second drive output;

base drive means responsive to said first linear drive output for providing n translational base-drive outputs where n is greater than one, said base drive means including an elongated base member and a base-drive linkage housed by said base member, said n translational base-drive outputs having parallel axes of translation, said parallel axes of translation being generally perpendicular to said base member;

n insulating support columns being rotatably mounted and disposed with respect to said base member such that each of said n insulating support columns is aligned with and connected to a respective one of said n translational base-drive outputs, each of said n insulating support columns having an elongated longitudinal bore extending therethrough and an elongated operating member extending through said elongated longitudinal bore and being arranged for relative rotation and translational movement with respect to said insulating support columns;

n interrupting units, each of said n interrupting units including an actuating member movable along a translational path to effect opening and closing of said interrupting unit, each of said n interrupting units being arranged such that a respective one of said actuating members is adjacent a respective one of said n operating members of said n insulating support columns;

means for connecting each of said n actuating members of said interrupting units to a respective one of said n elongated operating members of said insulating support columns; and a second drive linkage being connected to said second drive output, said second drive linkage being connected to rotate said n insulating support columns.

10. A method for providing any one of a plurality of different circuit protection drive configurations by selectively arranging and assembling a plurality of components, said components including, an operator including a first linear drive output and a second drive output, base drive means responsive to said first linear drive output for providing n translational base-drive outputs, where n is greater than one, said base drive means including an elongated base member and a base-drive linkage housed by said base member, said n translational base-drive outputs having parallel axes of translation, said parallel axes of translation being generally perpendicular to said base member, n insulating support columns being disposed with respect to said base member such that each of said n insulating support columns is aligned with and connected to respective one of said n translational base-drive outputs, each of said n insulating support columns having an elongated longitudinal bore extending therethrough and an elongated operating member extending through said elongated longitudinal bore, each of said insulating support columns including means adapted for rotatably mounting said insulating support columns and for providing relative rotation and translation of said operating member with respect to said insulating support columns, n interrupting units, each of said n interrupting units including an actuating member movable along a translational path to effect opening and closing of said interrupting unit, each of said n interrupting units being arranged such that said respective actuating member is adjacent one of said n operating members of said n insulating support columns, n disconnect mechanisms, each of said n disconnect mechanisms being carried by a respective one of said n insulating support columns such that rotation of said n insulating support columns provides operation of said n disconnect mechanisms, and a second drive linkage connected to said second drive output, said second drive linkage being connected to rotate said n insulating support column, the method comprising the steps of:

assembling and interconnecting said operator, said base drive means, and n of said insulating support columns for each of said plurality of circuit protection device configurations;

affixing each of said interrupting units to a respective one of said insulating support columns such that a respective one of said operating members and a respective one of said actuating members are generally aligned, and interconnecting said respective operating member and actuating member to provide a first configuration;

affixing each of said interrupting units to a respective one of said insulating support columns such that a respective one of said operating members and a respective one of said actuating members are arranged and interconnected substantially perpendicularly to each other to provide a second configuration; and providing a third configuration by the addition to said second configuration of said second drive linkage and said n disconnect mechanisms.

* * * * *

UNITED STATES PATENT AND TRADEMARK OFFICE
CERTIFICATE OF CORRECTION

PATENT NO. : 4,752,859

DATED : June 21, 1988

INVENTOR(S) : L. V. Chabala, et al

It is certified that error appears in the above-identified patent and that said Letters Patent is hereby corrected as shown below:

Col. 1, line 14, "respectively filed" should be -- filed respectively --;

line 15, "all" should be -- al --;

Col. 4, line 51, "the" (second occurrence) should be -- The --;

Col. 6, line 47, before "94" (second occurrence) insert -- 92 through a rotary to twisting translation mechanism 96. The disconnect blade --;

Col. 10, line 42, claim 8, "rotatably" should be -- rotatable --;

Col. 12, line 20, claim 10, "column" should be -- columns --.

Signed and Sealed this

Fifteenth Day of November, 1988

Attest:

DONALD J. QUIGG

*Attesting Officer*      *Commissioner of Patents and Trademarks*